UNITED STATES PATENT OFFICE.

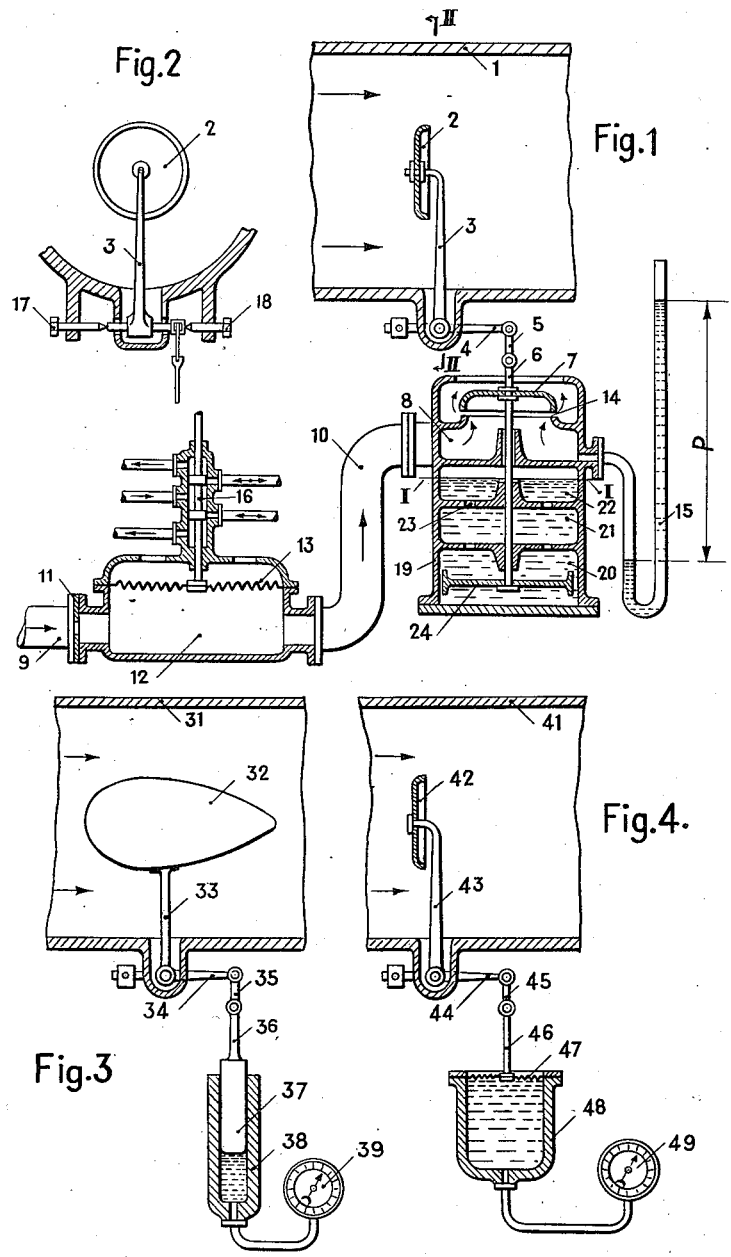

BENJAMIN GRAEMIGER, OF ZURICH, SWITZERLAND, ASSIGNOR TO AKTIENGESELL-SCHAFT DER MASCHINENFABRIKEN ESCHER WYSS & CO., OF ZURICH, SWITZERLAND.

DEVICE FOR MEASURING OR CONTROLLING THE VELOCITY OF FLOWING FLUIDS.

1,407,060.          Specification of Letters Patent.      Patented Feb. 21, 1922.

Application filed August 24, 1918. Serial No. 251,208.

*To all whom it may concern:*

Be it known that I, BENJAMIN GRAEMIGER, a citizen of the Republic of Switzerland, residing at Zurich, Hardturmstrasse 19, Switzerland, have invented certain new and useful Improvements in Devices for Measuring or Controlling the Velocity of Flowing Fluids; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

The object of the present invention is a device for measuring or controlling the velocity of flowing fluids. According to this invention a movable resisting member located in the path of the current of said fluid is operatively connected to a resilient or movable portion of the confining wall of an auxiliary pressure chamber, so that the thrust exerted by the current of fluid upon the resisting member produces in the auxiliary pressure chamber a corresponding specific pressure, which is then used for measuring or controlling the velocity of flow of the main fluid. The resisting member may be a plate, a float or the like.

The device may be so constructed that the resisting member controls a passage in a chamber through which a pressure medium flows. The resilient or movable portion of the confining wall of the auxiliary pressure chamber may be formed as a piston or plunger, or the auxiliary pressure chamber may be a diaphragm.

This invention will now be more particularly described with reference to the accompanying drawing illustrating by way of example several convenient forms of carrying out the invention. In this drawing:

Figure 1 is a vertical longitudinal section through a controlling device which serves to control the flow of air passing through a pipe connected to an air compressor.

Fig. 2 is a section on the line II—II of Fig. 1.

Fig. 3 is partly a front elevation and partly a fragmentary vertical longitudinal section of a second construction of the device intended solely for measuring purposes, and Fig. 4 is partly a front elevation and partly a fragmentary vertical longitudinal section of a further construction of the device, also intended solely for measuring purposes.

In the first constructional embodiment of my invention, as illustrated in Figs. 1 and 2, the numeral 1 denotes a pipe, through which, for instance air, is passed. Centrically therein and opposed broadside to the air current, directed from left to right as indicated by the arrows, there is arranged a plate 2 which acts through the bell crank lever 3—4, the link 5 and the rod 6 upon a horizontally disposed disc valve 7. The latter cooperates with the upper part of a chamber 8 into which through pipes 9 and 10 air is constantly forced from the left under relatively high pressure. Between the pipes 9 and 10 there are interposed a throttling disc 11 and an enlarged chamber 12, the upper part of which is closed by a diaphragm 13.

As long as the position of the valve disc 7 relatively to the wall of the chamber 8 and the pressure within the supply pipe 9 remain fixed a uniform amount of air will pass through the annular slot or port 14 and a constant pressure $p$ will be obtained in the chamber 8, which pressure is shown by the water column in the U-glass tube 15. Upon the quantity and therefore the velocity of flow of the air in pipe 1 being raised the plate member 2 will be acted on by a correspondingly higher thrust directed from left to right, with the result that the equilibrium existing till now between the thrust on the plate 2 and the raising force acting on the disc valve 7 is disturbed and the latter will descend a certain amount. The port 14 is somewhat narrowed and its throttling action enhanced which results in the pressure in chamber 8 being increased. The diaphragm 13 is raised upwardly and it adjusts thereby an oil controlling valve 16 so, that the valve gear of the driving engine of the air compressor (which mechanisms forming no part of my invention have not been illustrated) actuated by said valve 16 is influenced in the sense of causing a reduction in the feed of the driving medium, which entails a corresponding slowing down of the speed of the compressor. Thus, the increase in the air flow velocity in the pipe 1 can be kept within predetermined, optionally narrow limits.

For the purpose of producing as little friction as possible, the bell crank lever 3—4 is preferably hung up between pointed screws 17, 18, as shown in Fig. 2.

The casing housing the pressure chamber 8 contains three further superposed chambers 20, 21 and 22, which intercommunicate by means of bores 23 and are filled with oil up to the level I—I. Within the lowermost chamber 20 the end of the downwardly extended valve stem 6 carries a resistance or drag disc 24. This mechanism serves as an oil dashpot or oilbrake for the controlling device.

In the constructional modification according to Fig. 3 there is provided in the pipe 31 instead of a disc an ovoid body 32 which by means of the bell crank lever 33, 34, the link 35, and the rod 36 reciprocates a plunger 37 within a cylinder 38, which plunger compresses thereby to a certain degree a liquid contained in the space situated below the plunger 37. The pressure exerted on this liquid by the plunger can be read off on the communicating pressure gage 39, which latter gives a measure of the thrust exerted on the body 32 by the air passing through the pipe 31, that is to say, a measure of the velocity with which the air flows through the main 31. By relatively dimensioning the ovoid body 32 and the plunger 37 it is possible to cause even small variations in the rate of air flow to be multiplied to a relatively large extent and to be shown as such in the pressure gage 39 by correspondingly extended deflections of the indicator hand.

In the construction illustrated in Fig. 4 I have used again a disc-shaped resisting member 42, connected to a diaphragm 47 by means of the lever mechanism 43, 44, 45 and 46, which diaphragm closes the top of the cylindrical container 48 filled with oil. Any displacement of the member 42 toward the right or the left will, obviously, cause the diaphragm to correspondingly bend through in down or up direction, with a corresponding change in the pressure prevailing in the container 48, which latter is provided with the pressure gage 49.

The described arrangements have the feature in common that the total thrust exerted on a resisting member inserted into a stream of gas or liquid by the energy of flow of the fluid is used for producing within an auxiliary pressure chamber a corresponding specific pressure, which latter pressure is then brought to act upon a device for measuring or controlling the velocity of the flowing fluid medium.

Small variations in the velocity of the air or liquid and corresponding inconsiderable axial displacements of the resisting member suffice to responsively produce in the auxiliary pressure chamber relatively considerable variations in the specific pressure, in consequence of which the intended measuring or controlling operations will be highly sensitive and accurate.

What I claim is:

1. In a device for producing in a medium a pressure which is dependent on the velocity of a flowing fluid, the combination with a conduit containing the flowing fluid, a movable resistance member within said conduit and fluid and spaced from the walls of the conduit to permit passage of the fluid past said member under all conditions of operation, an auxiliary pressure chamber having a port leading to the atmosphere, a disc-valve cooperating with said port, means connecting said movable resisting member to the disc-valve for moving the latter upon a movement of the resisting member to change the specific pressure in said auxiliary chamber.

2. In a device for producing in a medium a pressure which is dependent on the velocity of a flowing fluid, the combination with a conduit containing the flowing fluid, a movable resistance member within said conduit and fluid and spaced from the walls of the conduit to permit passage of the fluid past said member under all conditions of operation, a subdivided receptacle comprising a pressure chamber supplied with fluid under pressure and having a port and lower intercommunicating oil chambers, a valve controlling the venting of said port to the atmosphere, lever means connecting said movable resisting member to said valve for moving the latter upon a movement of the resisting member to change the specific pressure in said pressure chamber, and a drag member in the lowermost of said oil chambers connected to said valve.

3. In a device for producing in a medium a pressure which is dependent on the velocity of a flowing fluid, the combination with a conduit containing the flowing fluid, a pivoted resistance member within said conduit and fluid and spaced from the walls of the conduit to permit passage of the fluid past said member under all conditions of operation, an auxiliary pressure chamber having a port, a disc-valve controlling the venting of said port to the atmosphere, means connecting said movable resisting member to the disc-valve for moving the latter upon a movement of the resisting member to change the specific pressure in said auxiliary chamber and indicating means to indicate the pressure inside said pressure chamber.

4. In a device for producing in a medium a pressure which is dependent on the velocity of a flowing fluid, the combination with a conduit containing the flowing fluid, a movable resistance member within said conduit and fluid and spaced from the walls of the conduit to permit passage of the fluid past said member under all conditions of operation, a subdivided receptacle comprising a pressure chamber having a port and lower intercommunicating oil chambers, a disc-valve controlling the venting of said port to the atmosphere, lever means connecting said movable resisting member to the disc-valve for moving the latter upon a movement of the resisting member to change the specific pressure in said pressure chamber, a drag member in the lowermost of said oil chambers connected to said disc-valve, and indicating means to indicate the pressure inside said pressure chamber.

In testimony that I claim the foregoing as my invention, I have signed my name.

BENJAMIN GRAEMIGER.